United States Patent [19]

Lord

[11] 4,203,566
[45] May 20, 1980

[54] AIR INLET CONTROL FOR AIRCRAFT OR THE LIKE

[75] Inventor: Thomas J. Lord, Dayton, Ohio

[73] Assignee: United Aircraft Products, Inc., Dayton, Ohio

[21] Appl. No.: 935,557

[22] Filed: Aug. 21, 1978

[51] Int. Cl.² .............................................. B64C 1/14
[52] U.S. Cl. ........................................ 244/57; 49/76; 98/121 A; 165/39; 165/41; 236/352; 244/53 B
[58] Field of Search ............... 244/53 B, 58, 59, 1 R, 244/57, 12.3, 23 A, 23 B, 12.5; 49/74, 75, 76, 2; 165/39, 41, 44; 236/35.2, 35.3; 98/121 A, 88 L, 112

[56] References Cited

U.S. PATENT DOCUMENTS

| 1,585,091 | 5/1926 | Galli ............................ 49/74 X |
| 3,099,423 | 7/1963 | Wilde et al. ............... 244/12.3 X |
| 3,292,864 | 12/1966 | Edkins ............................ 244/12.5 |
| 3,388,878 | 6/1968 | Peterson et al. ............ 244/12.3 X |

FOREIGN PATENT DOCUMENTS

| 116090 | 1/1968 | Denmark ........................ 49/76 |
| 861931 | 2/1941 | France ............................ 244/57 |

Primary Examiner—Barry L. Kelmachter
Attorney, Agent, or Firm—J. E. Beringer

[57] ABSTRACT

An air inlet control inset in the skin or outer wall surface of an aircraft or the like. The control device has an open position in which it is able to capture ram air flowing over the wall surface and which at the same time defines an open flow area through which lower pressure ambient air can be inducted when ram air is unavailable. The air inlet control includes a shutter opening into ram air flow, and an actuating mechanism therefor. In one disclosed form of the invention, the shutter is aerodynamically biased to reduce actuating forces required to close the shutter against ram air pressure.

9 Claims, 6 Drawing Figures

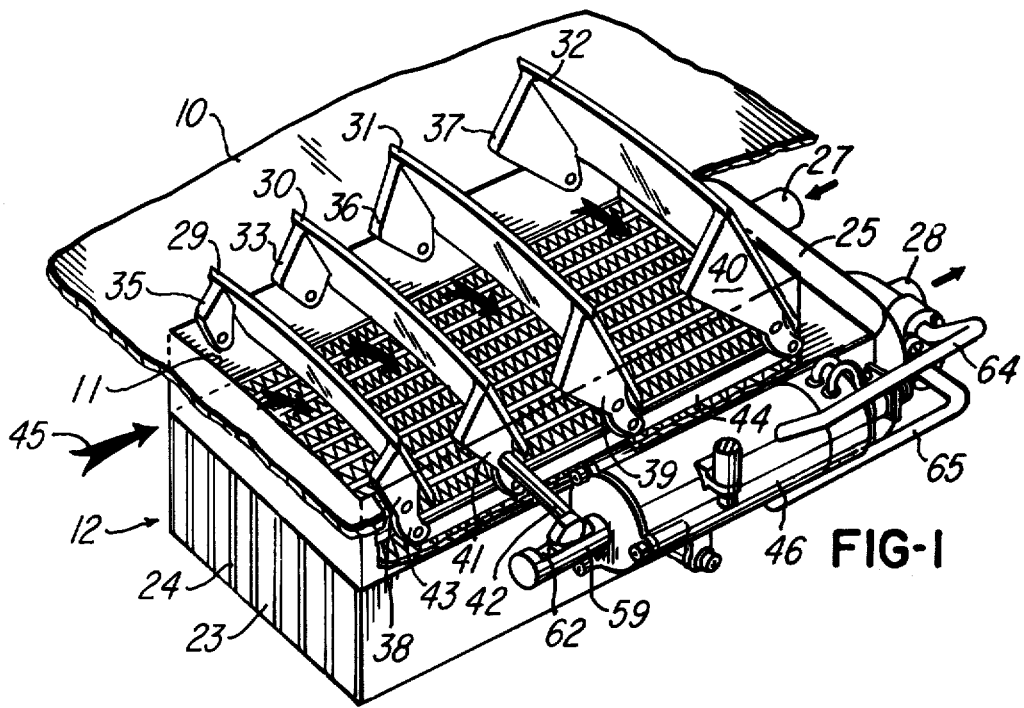

AIR INLET CONTROL FOR AIRCRAFT OR THE LIKE

BACKGROUND OF THE INVENTION

In an aircraft or like vehicle, a skin covering or outer wall surface thereof may have an opening to admit air from ambient surroundings. Admitted air may, for example, act as a coolant in an interiorly positioning heat exchanger. For reasons of aerodynamic efficiency, particularly in the case of high speed aircraft, a surface in which the opening appears is not in a confronting relation to air flows generated by movement of the vehicle through the atmosphere, but rather is generally parallel thereto. An air capturing and deflecting device is projectible from the wall surface into the passing air stream, when it is desired to admit air, and is retractable into the wall surface when an intake of air is unneeded. For convenience of description, the air capturing and deflecting device will be termed an air scoop which has open and closed positions relative to the air flows into the controlled wall surface opening.

This arrangement has certain disadvantages. In a vehicle in motion, forces applied to close the air scoop are opposed by ram air, that is, air flowing over the skin or exterior wall surface of the vehicle. In this connection, air immediately adjacent to the outer skin of an aircraft in high speed operation may have an elevated temperature making it unusable as a coolant. Under these conditions, it is desirable that the air scoop be closed. Closing is accomplished against the urging of ram air pressure. This can be quite high, requiring application of powerful closing forces. Also, a cooling system of which the air scoop is a part may have a requirement for in-flight or in-motion use and a requirement for on-the-ground or stationary use. The high pressure of ram air enables delivery of an adequate volume of air to the heat exchanger using a relatively small open flow area in the scoop. In static conditions of use, however, the open flow area required to deliver an adequate volume of air to the heat exchanger may be five to six times that needed for delivery of ram air. In the prior art, therefore, there has been little if any use of an air scoop both to admit ram air and to admit inducted air. Further, when the force applied to close the air scoop is a spring stressed in the opening of the scoop, whatever actuating mechanism is provided to open the scoop must work against resisting spring forces. These, as noted, can be quite high and must be overcome by applied opening forces.

In general, therefore, a retractable air scoop of the prior art is unsuited for plural use operation, or, at best, represents a compromise between essentially conflicting requirements. Also, the prior art scoop is relatively bulky and costly in construction since it is biased by ram air to an open position and requires relatively strong and expensive controls for its closing. In some instances, moreover, space in which to accommodate the air scoop and its extending and retracting mechanism is so limited as to present serious design problems in adapting the device to space available.

SUMMARY OF THE INVENTION

The instant invention obviates problems of the prior art. It provides an air scoop able to capture and direct high energy air flows and which has adequate open flow area for an induction of required air flows under static or on-the-ground conditions of use. A use of a shutter means is contemplated by illustrated forms of the invention, with shutter blades opening forwardly or into ram air flows. Individual shutter blades may in this manner intercept and deflect respective laminar portions of an air stream, and in a fully open position of the shutter blades large open area is defined between them for the admission of low pressure inducted air flows.

In one illustrated form of the invention, shutter blades appear in series relation and each successive blade, having regard to the direction of ram air flow over the series, is incrementally longer than the immediately preceding blade. The total projected blade area is calculated to capture an air flow sufficient to air needs under ram flow conditions. Under static or ground conditions, wherein air can pass between the shutter blades from any direction, a much larger area is available for inducted air flows. Open and closing the movements of the shutter blades is accomplished by appropriate actuating mechanism. This may include a thermal actuator responding to the changing temperature of a circulated liquid or other fluid cooled by the flowing air.

In another illustrated form of the invention, shutter blades in series relation are automatically opened and closed as a part of a movement extending and retracting the series of blades out of and back to a nested position in an aircraft skin or like outer wall surface. In an extending movement, the shutter is projected to a tilted position, facing into a ram air flow. A retracting movement lowers the shutter to a position substantially planar with or relatively recessed in the aircraft skin or other wall surface. The shutter blades rock to an open position as the shutter is raised to a tilted position. They close as the shutter retracts to a lowered position. An actuating mechanism for raising and lowering the shutter, with accompanying opening and closing movements of the shutter blades, is compactly positioned to obviate interference either with the shutter blades or with a movable shutter frame of which the blades are a part. Properly to accommodate movement of shutter, and associated parts, may be a difficult design problem, especially when admitted air is directed to an adjacent heat exchanger and still more particularly when the shutter open area accepting an adequate flow of inducted air must be on the order of four to five times that needed for ram flow conditions.

In a raised position of the shutter, with shutter blades open, the blades are aerodynamically biased toward a closed position by ram air flows, and exposed portions of the shutter frame similarly position to be urged to a closed position. This has the effect of reducing the level of forces which must be applied in a lowering of the shutter and closing of the shutter blades. In an instance where motive power for opening the shutter works against a spring which provides the return or closing force, a relatively low level of applied power is required, since the spring force to be overcome can be relatively light. In the event of motive power being provided by a thermal actuator, as before mentioned, an electrical heater overriding the normal response of the actuator may be used to obtain opening of the shutter for static operations.

An object of the invention is to provide an air capturing or air scoop device characterized substantially as in the foregoing.

Other objects and structural details of the invention will appear more clearly from the following description, when read in conjunction with the accompanying drawings, wherein:

FIG. 1 is a view in perspective, partly diagrammatic, of an air scoop-heat exchanger arrangement according to an illustrated embodiment of the invention;

FIG. 2 is a view in cross section through the structure of FIG. 1;

FIG. 3 is a view in longitudinal section of an actuator mechanism comprised in the structure of FIG. 1;

Figure 4:
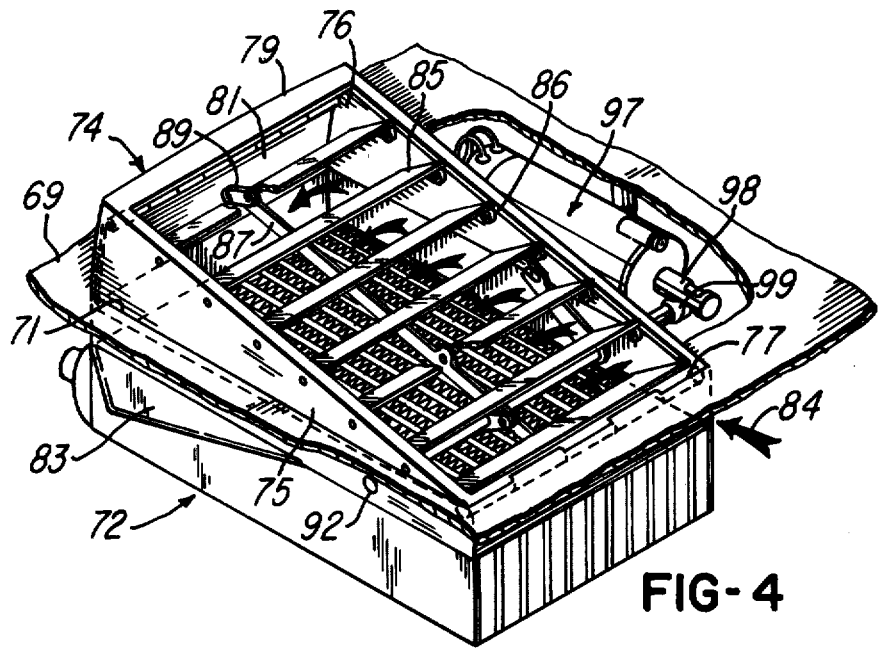
FIG. 4 is a view similar to FIG. 1, showing another illustrated embodiment of the invention, the air scoop being shown in an open position.

The invention has a general application to air inlet control mechanisms in vehicles but is in its illustrated embodiments of the invention disclosed as forming an air scoop apparatus which is alternatively recessed within or projected relatively to the outer skin covering of an aircraft. More particularly, in its illustrated embodiments, the invention refers to and discloses an air scoop apparatus in conjunction with a heat exchanger performing fuel cooling functions in an aircraft environment.

Under relatively low speed flight conditions, and during on-the-ground operation, it may be desirable to cool liquid fuel as it flows to the engines. Under relatively high speed flight conditions cooling of the flowing fuel may be unnecessary, due to increased flow rates. Also, under high speed flight conditions, air temperatures adjacent to the aircraft skin covering may be too high to allow the use of such adjacent flowing air as a coolant.

In its illustrated forms, the invention places a heat exchanger interiorly of the aircraft skin covering and connects it in a line flowing liquid fuel from a place of storage to a place of use. The heat exchanger presents a face thereof to an opening in the skin covering, and air entering such opening is allowed to flow through air passages in the heat exchanger where it is in heat transfer relation to the flowing fuel. An air scoop apparatus according to the illustrated embodiments of the invention is adjustable between open and closed positions, in the former of which it captures and directs exterior air to the heat exchanger and in the latter of which it denies access of air to the heat exchanger. It is to be understood, in this connection, that the invention does not depend for its utility upon the use of a heat exchanger of any particular construction or use, or, indeed, upon the use of any heat exchanger. The air scoop mechanism of the invention is capable of independent use for an admission or denial of exterior air for any useful purpose.

In the invention embodiment of FIGS. 1 to 3, an aircraft skin covering 10 has an opening 11 therein, the opening 11 being of a generally rectangular configuration. Occupying a recessed or suspended relation to the skin 10 and its opening 11 is a heat exchanger 12. As indicated in FIG. 2, the heat exchanger may be attached, as by welding, to structural members 13 and 14 dependent from the skin 10. The arrangement places the heat exchanger 12 below and generally in line with opening 11. Very briefly considering the structure of the heat exchanger 12, it is a device of the plate and fin type in which fluids of different temperature can flow in a separated, heat conductive relation to one another. It is comprised of multiple plate and fin parts appropriately stacked and arranged and united as by brazing into a unitary device. It includes side walls 15 and 16 and intermediately positioning core plates or sheets 17. Upper and lower spacer members 18 and 19 position between certain of the core sheets 17 and define finned liquid flow passages 21. In alternating relation to the liquid flow passages 21 are finned air flow passages 22. At opposite ends, the passages 22 are closed by end spacers 23 (shown at one end only of the heat exchanger). At one end of the heat exchanger, the passages 21 are closed by spacer members 24, passages 21 at the opposite end of the heat exchanger opening into a manifold 25. The arrangement places fluids passing through passages 21 and 22 in an essentially cross flow relation to one another and places them, moreover, in a heat transfer relation, the core sheets 17 and the fin material in passages 21 and 22 providing a means for transfer of heat by conduction-convention effects. In a manner in which it is unnecessary here to consider, other spacer members 25 in the heat exchanger cause the fluid in passages 21 to move in a two pass flow down one side of the heat exchanger and back to the other. The manifold 25 has an inlet 27 and an outlet 28. A confined fluid, in the illustrated instance a liquid fuel, enters the manifold 25 by inlet 27, flows through communicating passages 21 down one side of the heat exchanger moves to the other side thereof through an interior crossover passage (not shown) and returns along passages 21 to the manifold to exit by way of outlet fitting 28. Flow passages 22 are open from top to bottom thereof and upper ends of the passages are in a facing relation to skin opening 11. Air entering opening 11 has access to and is allowed to pass through passages 22 wherein it is in heat transfer relation to fuel in passages 21.

The intake of air through opening 11 is controlled by series arranged shutter blades 29-32 in bridging relation to the opening. The shutter blades are constructed to have the configuration of segments of the skin covering and may, as indicated in FIG. 2, have a curvature matching a curvature of the skin covering. In a closed position, the shutter blades have their opposite ends in a substantially touching relation to one another or to opposite ends of the opening 11 and so deny a flow of air to the heat exchanger through the opening 11. In an open position, as illustrated in FIG. 1, the blades define open area therebetween, and, in addition, project into an air stream which may pass over the skin covering 10 to capture and redirect downward portions of such stream. In this connection, reference will be made hereinafter to "ram air" and it will be understood that this term is used to identify ambient air which flows over the surface of skin 10 when the aircraft is in flight.

The shutter blade 30 has at one end thereof a dependent lug 33 which by means of a pivot stud 34 (FIG. 2) is effectively hinged to structural member 13. Shutter blades 29, 31 and 32 have similar dependent lugs 35, 36 and 37 similarly pivotally connected to the dependent structure 13. At their opposite ends, blades 29, 31 and 32 have dependent lugs 38, 39 and 40 pivotally connected, as in the manner of opposite ends thereof, to structural member 14. In the case of shutter blade 30, a dependent lug 41 at the opposite end thereof has a keyed connection to a short length shaft 42 which has a bearing in structural member 14 and extends through and beyond such member beneath skin covering 10. As will be seen, shaft 42 is part of an actuating mechanism for opening and closing the shutter blades. Each dependent lug 38, 39, 40 and 41 has a downwardly projecting finger portion 43 commonly and pivotally connected to a gang link 44. The arrangement is one to require the shutter blades to open and close in unison.

The direction of movement of ram air over the skin covering 10 is in a direction as indicated by flow arrows 45. The orientation of the series arranged shutter blades is one to place the blade 29 in a leading relation to the air flow and blade 32 in a trailing relation. The shutter blades open into the air stream which successively encounters blades 29, 30, 31 and 32. The blades each have a generally rectangular configuration and have a leading end or edge facing into the flowing air stream and an opposite or trailing end or edge. Pivot points for the respective blades are offset toward the trailing edge thereo. The distance between a leading and trailing edge may be regarded as defining the length of the blade, and, it will in this connection be seen that blade 30 is longer than blade 29, that blade 31 is longer than blade 30, and that blade 32 is longer than blade 31. The several blades are mounted to structural members 13 and 14 in a substantially common transverse plane. Accordingly, the differential blade length results in upper portions of adjacent blades being in an offset or overlapping relation to one another. As ram air flows over the skin covering 10, therefore, a lower laminar layer thereof encounters the blade 29 and is deflected downwardly upon the face of heat exchanger 12. A next higher laminar layer of ram air encounters a relatively projecting portion of blade 30 and is deflected thereby downwardly to the heat exchanger. Similarly, successively higher laminar layers of ram air are captured and deflected by upper projecting portions of shutter blades 31 and 32 respectively. The several shutter blades 29-32 accordingly cooperate in forming an air scoop which in an open position of the parts captures high pressure, ram air and deflects it downwardly upon the heat exchanger 12 in a volume and flow rate adequate to perform the required heat transfer task.

Under flight conditions, large amounts of high pressure air are available for capturing and for directing to the heat exchanger. Relatively small intercepting areas as provided by overlapping portions of the shutter blades are accordingly sufficient to air flow requirements. If the system is operated under on-the-ground conditions, however, substantially larger flow areas are required since ram air is at this time not available. This requirement is met by the arrangement of shutter blades, since, in an open position therefore, the blades define large intervening spaces through which air can be inducted to flow to and through the passages 22. It will, in this regard, be understood that in flight conditions ram air provides its own pressure for compelling flow to and through the heat exchanger. On the ground air flow must be induced and this will suitably be accomplished by engine driven or like fan means (not shown). The air may enter between the blades at any angle, for ground operation conditions. In flight conditions, as noted, the incrementally greater length of each successive blade encountered by the ram air provides a total projected area sufficient for ram flight conditions.

Opening and closing of the shutter blades can be accomplished by any suitable remotely controlled power means, such as a hydraulic, pneumatic or electrical motor drive. In the illustrated instance, a thermal actuator is used, responding to a changing temperature of the fuel reaching the heat exchanger by way of inlet 27. A cylinder 46 positions along side the heat exchanger 12 and is mounted rigidly with the heat exchanger and with skin covering 10 by means including brackets 47 and 48 (FIG. 2). One end of the cylinder 46 is closed by a plate 49 while the other end has a plug 51 installed therein. In a manner not fully shown herein, both plate 49 and plug 51 are secured, as by bolting, to respective flanged ends of the cylinder. Within the cylinder is a power element 53, the element illustrated being a known device containing a wax-like material which, when heated, expands powerfully. A head portion of element 53 reacts upon and is recessed within plug 51. A projected portion of the power device is mounted within an interior partition 54 of the cylinder 46 and has a plunger 55 projecting through and beyond partition 54 toward end plate 49. Partition 54 forms with plug 51 an interior chamber 56 and forms with end plate 49 an interior chamber 57. Reciprocable in chamber 57 is a sleeve 58, a reduced diameter portion 59 of which extends through and beyond plate 49. A compression spring 61 is received in chamber 57. It seats at one end to the plate 49 and bears at its other end on an expanded portion of sleeve 58. The spring 61 maintains sleeve 58 in engagement with plunger 55 extending from the power element 53. The outer projecting end of sleeve extension 59 has a transverse slot 62 therein into which projects a cam formation 63 formed integrally with or otherwise secured to actuating shaft 42. The arrangement, as will be evident, is one in which extending and retracting motions of the sleeve extension 59 relatively to cylinder 46 achieves a rocking motion of shaft 42 and thereby a raising and lowering of the shutter blades 29-32. Fluid conducting lines 64 and 65 attach at their one ends to cylinder 46 in position to communicate with chamber 56. At their other ends, fluid conducting lines 64 and 65 communicate in a manner not fully shown herein with inlet 27 of the heat exchanger. The arrangement is one in which at least a portion of the fluid reaching the heat exchanger by way of inlet 27 flows through conductor 64 to chamber 56 and returns to the inlet for flow through the heat exchanger by way of conductor 65. In flowing from conductor 64 to conductor 65, the fluid is in chamber 56 in contact with thermal power element 53. The power element accordingly senses changes in fluid temperature, and, as the fluid temperature rises, responds thereto by extending plunger 55. This in turn extends sleeve 58 in opposition to spring 61 and effects a clockwise direction of motion of shaft 42, as viewed in FIG. 3. This rocks shutter blade 30 to an upward or open position and a like unison motion occurs in all of the several shutter blades due to their interconnection by gang link 44. Under a lowering fluid temperatur, spring 61 assumes control of the actuating mechanism and returns sleeve 58 leftward or in a direction to effect a counterclockwise movement of shaft 42 and thereby a return to a closed position of shutter blades 29-32. At the same time, the sleeve 58 returns plunger 55 inward to a retracted position, recompressing the thermal material within the power element. Spring 61 is made sufficiently strong as to be able to move shutter blades 29-32 to a closed position, against the opposition of ram air pressures. Thus, in an in-flight operation if the fluid entering the heat exchanger at inlet 27 is found to be not in need of cooling, spring 61 is allowed to close the shutter blades. The resistance imposed by raised blades accordingly is obviated, and, at the same time, air adjacent to skin covering 10 which may be heated is denied access to the heat exchanger.

The plug 51 at one end of the heat exchanger incorporates an electrical heater means 66 selectively energized by means including an electrical cable 67. An installation cap 68 covers the heater means 66. The heater means 66 and related parts are provided for test and like purposes. Thus, if it is desired to exercise the system for test purposes electrical current is supplied to heater means 66 and the temperature of plug 51 thereby raised. The rising temperature of the plug 51 is transmitted to the nested power element 53. The latter senses such rising temperature and responds thereto in the same manner that it responds to rising fluid temperature in that it extends plunger 55 and initiates an opening of shutter blades 29-32.

The connection of sleeve extension 59 with shaft 42, through cam formation 63, is an impositive one. The arrangement provides for permitted overtravel of the sleeve 58 beyond a position fully opening the shutter blades in the event temperatures sensed by the power element 53 continue to rise beyond a point at which the blades are fully open. The cam formation 63, and slot 62 are configured in a manner to retain a cooperative relationship of the parts while permitting the described overtravel of the actuating sleeve. In the illustrated embodiment of FIGS. 4, 5 and 6, an aircraft skin covering 69 has a generally rectangular opening 71 therein positioning interiorly of the aircraft skin covering, and approximately aligned with the opening 71, is a heat exchanger 72 which is, or may be, substantially the same as the heat exchanger 12. The skin covering 69 has a dependent wall structure 73 effectively defining a downward extension of opening 71 and to a lower end of which heat exchanger 72 may be secured to position in a suspended spaced relation to the skin covering.

Figure 5:
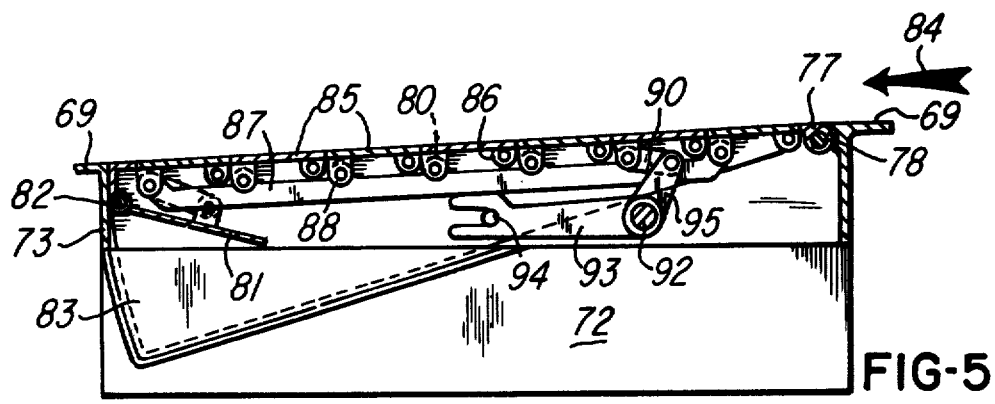
FIG. 5 is a view in longitudinal section of the structure of FIG. 4, the shutter blades being shown in a closed position.
Figure 6:
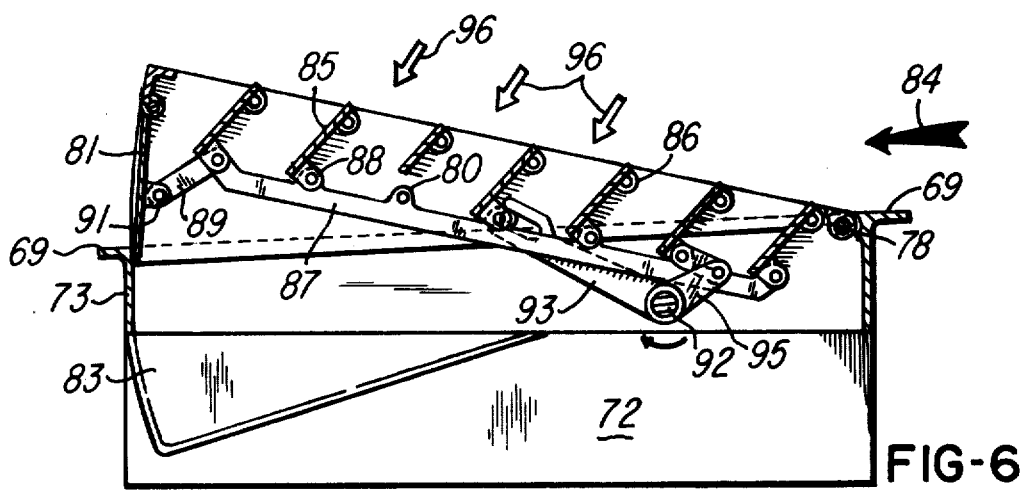
FIG. 6 is a view like FIG. 5, the apparatus being shown in an open position.

An air scoop apparatus according to this disclosed form of the invention includes a frame 74 comprised in part of laterally spaced apart side walls 75 and 76 of a triangular configuration. At their apex ends, the side walls 75 and 76 are interconnected by a narrow web 77 pivotally mounted on a rod 78 supported between interior walls of structural portion 73. Base ends of the walls 75 and 76 are interconnected, at what may be regarded as their upper extremities, by a right angle web portion 79. As indicated, the frame 74 may be made as a one-piece unitary article, with portions of interconnecting webs 77 and 79 turned over as indicated. In this regard, upper edges of the side walls 75 and 76 are bent over and present, along with webs 77 and 79, a surface to be impinged upon by flowing air. The frame 74 is hinged at its apex end to the skin covering 69 and is adjustable from a lowered position (FIG. 5) where it is substantially nested within the skin covering to a raised position in which it lies above the skin covering, occupying an inclined or ramplike relation thereto. In its raised position, the frame 74 defines an upward continuation of opening 71, the side walls 75 and 76 forming a continuing enclosure for the space above the heat exchanger 72. At the broad or base end of the frame 74, a flap 81 is dependent from angular web 79 and complements side walls 75 and 76 in defining an enclosure above the heat exchanger. The flap 81 in effect forms a back wall of the frame. It is hinged along an upper edge to the web 79, being pivotally mounted on a rod 82 mounting to the web portion. Hinging of the back wall or flap 81 is for the purpose of allowing the flap to raise from a position as shown in FIGS. 4 and 6 to a position as shown in FIG. 5 in order to avoid interference with the heat exchanger 72 when the frame 74 is lowered into the skin covering. Further in this regard, sides of the heat exchanger 72 may be formed with indentations 83 (one shown) to interfit with side walls 75 and 76. In a lowered position, the side walls 75 and 76 position in an embracing relation to the heat exchanger.

The orientation of the frame 74 in the skin covering 69 is such as to place its apex or hinged end to be first encountered by ram air flowing over the skin covering. The direction of flow of ram air is as indicated by arrows 84. The frame accordingly raises into ram air, which, as applied to upwardly presented surfaces of the frame, urges the frame downward or in a retracting sense.

The air scoop apparatus further comprises multiple, series arranged shutters 85 positioning in a bridging relation to frame side walls 75 and 76 near upper edges thereof. The blades 85 are approximately rectangular in configuration, with one of the longer sides thereof serving as the leading end of the blade, having regard to the direction of air flow over the scoop apparatus, and the other longer side serving as the trailing end. At each shorter side of each blade is a bent over ear 86 pivotally connected to respective frame side walls 75 and 76. The ears 86 are offset toward leading ends of their respective blades. The several shutter blades 85 accordingly mount for pivotal rocking motion between the frame side walls 75-76. In rocking to what may be regarded as a closed position, as shown in FIG. 5, the several blades occupy a substantially common plane and adjacent ends are in an approximately touching relation to one another. The area enclosed by frame 74 accordingly is at this time substantially sealed off or closed, with flowing air being denied access to the heat exchanger 72. The shutter blades are effectively recessed into the skin covering 69 and pose no obstruction to a free flow of ram air over the skin surface. In an open position, as shown in FIGS. 4 and 6, the shutter blades 85 are tilted relatively to one another and define open area therebetween through which ambient air may be admitted and directed to the heat exchanger. Opening and closing movements of the shutter blades are accomplished in unison since they are interconnected by a gang link 87. Thus, each blade 85, adjacent the trailing end thereof, has a dependent ear 88. Link 87 extends in a longitudinal intersecting relation to the series arranged shutter blades and is pivotally connected to each dependent ear 88, upstanding ears 80 being used for connection purposes. Near what may be regarded as a far end thereof, the link 87 is connected by a smaller link 89 to an ear 91 on the back flap 81. The arrangement is one to enforce a swinging movement of the flap 81 about its pivot 82 responsively to longitudinal shifting motion of the link 87. Link 89 interconnects ear 91 on the flap 81 and an ear 88 dependent from the first adjacent shutter blade 85, commonly connected to link 87. The arrangement approximates a toggle-like action in which a tilting movement of the shutter blades from a closed position to an open position forces link 89 and flap 81 downwardly from the position of FIG. 5 substantially to the position of FIG. 6.

Opening and closing of the shutter blades 85 is a function carried out in conjunction with raising and lowering of the frame 74. A shaft 92 is rotatably carried by structure member 73 in a transverse intersecting relation to opening 71 and underlies the series arrangement of shutters. Fixed to the shaft 92 is a pair of arms 93 (one shown) positioning adjacent respective frame side walls 75 and 76. An outer free end of each arm 93 is forked and engages a stud 94 set in a respective frame side wall. The shaft 92 positions intermediately of the opposite ends of frame 74. Accordingly, a rocking motion of the shaft 92 in a clockwise direction as viewed in FIG. 5 effects a corresponding movement of arms 93 and raises the frame 74 about its hinged connection to rod 78. Also secured to the shaft 92 is an arm 95 connected at its outer end to mating ears 80 and 88 on gang link 87 and a blade 85. It will be evident that the connected relation of the parts is such that a lifting motion of the frame 74 effectively lifts leading ends of the shutter blades 85 since the latter are pivotally attached to frame side walls 75–76 at the location of ears 86. At the same time, gank link 87 is moved forwardly, or to the right as seen in FIGS. 5 and 6, with the result that trailing ends of the shutter blades are pulled downwardly and forwardly. In response to an operation as described, the shutter parts and related operating mechanism move from a position as shown in FIG. 5 to a position as shown in FIG. 6 in which shutter blades are inclined relatively to the skin covering 69 and provide relatively wide open spaces therebetween through which air can reach the underlying heat exchanger 72. It will be seen, moreover, that raising of the frame 74 to the sloping position illustrated effectively elevates upper portions of the shutter blades relatively to immediately preceding blades. Thus, although the several blades 85 are all of the same length, their movement to an open position, in conjunction with raising of the frame 74, produces an air scoop arrangement comparable to that illustrated in FIG. 1. Each successive shutter blade is positioned to capture a laminar layer of ram air incrementally more distant from the skin 69 than is captured by the immediately preceding shutter blade. The total involved area is calculated to capture and to deflect a volume of ram air adequate to contemplated cooling purposes. Moreover, in an open position, the shutter blades provide relatively unlimited open area therebetween through which ambient air can be inducted, as indicated by arrows 96, when ram air is not available.

The shaft 92 may be rotated by any suitable means, such as a hydraulic, pneumatic or electrical drive. For purposes of illustration, a thermal actuator 97 has been shown associated with this disclosed air scoop apparatus in the same manner as the thermal actuator disclosed in FIG. 1. Operating to the same end and purpose as the actuator of the prior embodiment, thermal actuator 97 projects and retracts a sleeve extension 98 cooperatively engaged with a cam 99 on shaft 92 in the same manner that sleeve extension 59 of FIG. 3 is cooperatively engaged with cam 63 on shaft 42. Thus, extension of the member 98 is a function of rising temperature, whether naturally or artificially induced, while retraction of the extension member occurs as a spring confined in the actuator 97 is allowed to recover from a compressed condition responsively to lowering temperatures. It will be recognized to be a feature of the construction and mounting of the shutter blades 85 that when raised to an open position, the blades expose an undersurface thereof to ram air in such manner that the blades are urged thereby toward a closed position. Thus, the shutter blades 85 are, when in an open position and when moving between open and closed positions, aerodynamically biased toward closed position. Accordingly, whatever mechanism may be provided to close the shutter blades, and concurrently to lower frame 74, need not be made relatively large and powerful since its action is aided by involved aerodynamic forces. In the illustrated instance, this means that the return spring in actuator 97 can be relatively light. As a direct consequence of this, moreover, the thermal element provided to open the shutter blades can be relatively small since it is not required to work against or to compress a heavy return spring. Actuating mechanism for the aerodynamically biased shutter apparatus accordingly can be made to be small, compact and relatively inexpensive. Air incoming through open shutters is applied to flap 81 in a direction to hold the flap in an extended position and thereby is applied in a manner to hold the shutter blades in open position. Involved aerodynamic and lever forces can be balanced by selective placement of the ear 91 and appropriate sizing of the shutter blades. It will be recognized that ram air pressures which encounter upper projecting or leading ends of the shutter blades are captured thereby and deflected downwardly to the heat exchanger. In the course of such deflecting motion reactant pressures are applied to the underside of the shutter blades urging them in a clockwise direction as viewed in FIG. 6, or toward closed position. These forces similarly are applied through the gang link 87 to the forked arms 93 and tend thereby to apply a force to lower the frame 74. The exposed turned over areas on the upper face of the frame 74 are, as before noted, similarly presented to ram air pressures to urge a closing or lowering movement of the frame.

Flap 81 acts as a door effectively closing the downstream end of the scoop in a raised position thereof. In conjunction with a lowering or closing position of the scoop, the door lifts or collapses to a position more nearly parallel to blades 85 in a manner to obviate interference contact with the heat exchanger.

A limited number of embodiments of the invention have been disclosed. Modifications of and substitutions for disclosed components have been discussed and these and other variations in invention embodiments are regarded as being embraced by invention concepts.

What is claimed is:

1. An air inlet control in an outer wall surface over which an air stream flows adapted to be raised above said surface to capture and redirect a portion of the flowing air stream, said control including series arranged shutter blades and said control being oriented so that said blades are successively encountered by said flowing air stream, means mounting said blades for rocking motion from a closed position in which said blades are substantially nested in said surface to an open position in the course of which said blades assume tilted positions relative to said surface exposing undersides thereof as deflecting surfaces to said encountered air stream, means achieving automatically in response to opening of said shutter blades a progressively higher elevation of at least portions of said successive shutter blades whereby said successive blades capture and redirect different laminar air layers outwardly of said surface wherein said progressively higher elevation being achieved by tilting a frame of which said shutter blades are a part, said frame and shutter blades being interconnected by linkage means which form part of said mounting means so that a tilting movement of said frame causes by a tilting motion of said shutter blades relative to said frame, said shutter blades in said open position defining a relatively large open area through which air may be inducted in the absence of said air stream, and an actuating mechanism for effecting and controlling rocking movements of said shutter blades from said closed to said open position and back to said closed position.

2. An air inlet control according to claim 1, wherein said frame and said shutter blades are mounted so that a tilting of said frame is accompanied by a raising of leading ends of said blades and a lowering of trailing ends thereof, air stream portions captured by said open shutter blades applying a force thereto aerodynamically to bias the blades toward said closed position.

3. An air inlet control according to claim 2, said outer wall surface being part of a support structure, said frame being a rectangular member hinged at one end to said support structure, said actuating mechanism raising and lowering said frame about its hinged end, said hinged end of said frame being a leading end in relation to the direction of flow of the air stream and the opposite end being a trailing end.

4. An air inlet control according to claim 2, wherein said shutter blades are pivotally mounted in said frame, pivot connections of said blades within said frame being offset for an aerodynamic unbalance of said blades with resultant pressures being applied toward a movement of said blades to said closed position.

5. An air inlet control according to claim 3, upper portions of said frame presenting surfaces utilizing air stream flow over said outer wall surface as a force to lower said frame about its hinged end.

6. An air inlet control according to claim 3, said actuating mechanism including an oscillatory shaft, lever arm means operated by said shaft and connected to raise and lower said frame, and other lever arm means operated from said shaft to tilt at least one of said shutter blades, said blades being interconnected for unison motion.

7. An air inlet control in an outer wall surface over which an air stream flows adapted to be raised above said surface to capture and redirect a portion of the flowing air stream, said control including series arranged shutter blades and said control being oriented so that said blades thereof are successively encountered by said flowing air stream, means mounting said blades for rocking motion from a closed position in which said blades are substantially nested in said surface to an open position in the course of which said blades assume tilted positions relative to said surface exposing undersides thereof as deflecting surfaces to an encountered air stream, means achieving automatically in response to opening of said shutter blades a progressively higher elevation of at least portions of said successive shutter blades whereby said successive blades capture and redirect different laminar air layers outwardly of said surface wherein said progressively higher elevation being achieved by tilting a frame of which said shutter blades are a part, said frame and shutter blades being commonly actuated so that a tilting movement of said frame is accompanied by a tilting motion of said shutter blades, said series arranged shutter blades being mounted within said frame and being pivotally connected at side edges to side walls of said frame, said blades having leading and trailing ends in relation to the direction of flow of the air stream, said shutter blades being interconnected by a link extending longitudinally of said blades, each of said blades being pivotally connected to said link at a location offset toward the trailing end of the blade, said shutter blades in said open position defining a relatively large open area through which air may be inducted in the absence of said air stream, and an actuating mechanism for effecting and controlling rocking movements of said shutter blades from said closed to said open position and back to said closed position.

8. An air inlet control according to claim 7, the trailing end of said frame including a back plate hingedly connected at an upper end to side walls of said frame and free thereof at its lower end, and means pivotally connecting said link to said plate intermediately its upper and lower ends and effecting a swinging movement of said plate in response to raising and lowering of said frame.

9. An air inlet control according to claim 7, said actuating mechanism being connected to apply simultaneously a force to raise leading ends of said shutter blades and a force to lower trailing ends thereof, said forces being applied respectively in a raising of said frame and in effecting a longitudinal motion of said link.

* * * * *